US012803682B2

(12) United States Patent
Blessing et al.

(10) Patent No.: US 12,803,682 B2
(45) Date of Patent: Nov. 17, 2026

(54) METHOD FOR DETERMINING A QUALITY OF A WIRELESS TRANSMISSION OF DATA PACKETS OF A FIELD DEVICE

(71) Applicant: Endress+Hauser Flowtec AG, Reinach (CH)

(72) Inventors: Michael Blessing, Steinen (DE); Lukas Ostgen, Liestal (CH); Rebecca Page, Basel (CH); Nikolai Fink, Aesch (CH)

(73) Assignee: Endress+Hauser Flowtec AG, Reinach (CH)

( * ) Notice: Subject to any disclaimer, the term of this patent is extended or adjusted under 35 U.S.C. 154(b) by 227 days.

(21) Appl. No.: 18/721,691

(22) PCT Filed: Nov. 22, 2022

(86) PCT No.: PCT/EP2022/082780

§ 371 (c)(1),
(2) Date: Jun. 19, 2024

(87) PCT Pub. No.: WO2023/117259

PCT Pub. Date: Jun. 29, 2023

(65) Prior Publication Data

US 2025/0088289 A1 Mar. 13, 2025

(30) Foreign Application Priority Data

Dec. 22, 2021 (DE) ..................... 10 2021 134 259.7

(51) Int. Cl.
*H04B 17/10* (2015.01)
*H04L 1/00* (2006.01)
*H04W 24/02* (2009.01)

(52) U.S. Cl.
CPC ......... *H04B 17/104* (2015.01); *H04L 1/0061* (2013.01); *H04W 24/02* (2013.01)

(58) Field of Classification Search
CPC ..... H04B 17/104; H04L 1/0061; H04W 24/02
See application file for complete search history.

(56) References Cited

U.S. PATENT DOCUMENTS

2003/0112766 A1 6/2003 Riedel et al.
2014/0092736 A1* 4/2014 Baillargeon ............ H04L 43/08 370/252

(Continued)

FOREIGN PATENT DOCUMENTS

EP 3439241 A1 2/2019
EP 3576349 A1 * 12/2019 ............ H04W 24/08

OTHER PUBLICATIONS

Draves, et al., Comparison of Routing Metrics for Static Multi-Hop Wireless Networks, Session 4: Wireless and Delay-Tolerant Networks, SIGCOMM'04, Aug. 30-Sep. 3, 2004, 12 pp. (133-144).

(Continued)

*Primary Examiner* — Sujoy K Kundu
*Assistant Examiner* — Weibin Huang
(74) *Attorney, Agent, or Firm* — Mark A. Logan; Endress+Hauser (USA) Holding, Inc.

(57) ABSTRACT

A method for determining a quality of a wireless transmission of data packets of a field device via a wireless communications interface to a higher-level unit comprises sending the data packets via the wireless communications interface to the higher-level unit, wherein the data packets are sent intermittently; receiving the data packets through the higher-level unit; checking whether the time duration between two data packets received by means of the higher-level unit, a size of the respective data packets, and/or information stored in the respective data packets fulfills a criterion; and determining a communications status depending upon the check and optional output of the communications status.

8 Claims, 2 Drawing Sheets

(56) References Cited

U.S. PATENT DOCUMENTS

| | | | | |
|---|---|---|---|---|
| 2018/0225170 | A1* | 8/2018 | Tazzari | H04L 67/141 |
| 2020/0052981 | A1* | 2/2020 | Pandey | G06N 20/20 |
| 2020/0162178 | A1* | 5/2020 | Hubert | H04L 63/123 |
| 2020/0162948 | A1* | 5/2020 | Pei | A61B 5/0006 |
| 2021/0075776 | A1* | 3/2021 | Chen | H04L 63/0442 |
| 2023/0021214 | A1* | 1/2023 | Lehmer | G01R 31/086 |
| 2023/0144148 | A1* | 5/2023 | Gade | H04L 43/08 709/224 |

OTHER PUBLICATIONS

Cerar, et al., Machine Learning for Wireless Link Quality Estimation: A Survey, arXiv:1812.08856v10 [cs.NI] Jan. 18, 2021, 33 pp.

* cited by examiner

METHOD FOR DETERMINING A QUALITY OF A WIRELESS TRANSMISSION OF DATA PACKETS OF A FIELD DEVICE

CROSS-REFERENCE TO RELATED APPLICATIONS

The present application is related to and claims the priority benefit of DPMA Patent Application No. 10 2021 134 259.7, filed on Dec. 22, 2021, and International Patent Application No. PCT/EP2022/082780, filed Nov. 22, 2022, the entire contents of which are incorporated herein by reference.

TECHNICAL FIELD

The invention relates to a method for determining the quality of a wireless transmission of data packets of a field device via a wireless communications interface to a higher-level unit.

BACKGROUND

In automation, particularly in process automation, field devices serving to capture and/or modify process variables are frequently used. To capture process variables, sensors are used which are, for example, integrated into fill-level meters, flow meters, pressure and temperature meters, pH redox potential meters, conductivity meters, etc., which capture the corresponding process variables of fill level, flow, pressure, temperature, pH value, or conductivity. Actuators, such as, for example, valves or pumps, are used to influence process variables. The flow rate of a fluid in a pipeline section or a fill level in a container can thus be altered by means of actuators. In principle, all devices which are process-oriented and which supply or process process-relevant information are referred to as field devices. In connection with the invention, “field devices” therefore also refer to remote I/O’s, radio adapters, or, in general, electronic measuring components that are disposed at the field level. A field device is in particular selected from a group consisting of flow meters, fill-level measuring devices, pressure measuring devices, temperature measuring devices, limit-level measuring devices, and/or analytical measuring devices. Flow meters are, in particular, Coriolis, ultrasound, vortex, thermal and/or magnetically-inductive flow meters. Fill-level measuring devices are, in particular, microwave fill-level measuring devices, ultrasonic fill-level measuring devices, time-domain reflectometry measuring devices, radiometric fill-level measuring devices, capacitive fill-level measuring devices, inductive fill-level measuring devices, and/or temperature-sensitive fill-level measuring devices. Pressure-measuring devices are, in particular, absolute, relative, or differential-pressure devices. Temperature measuring devices are, in particular, measuring devices with thermocouples and/or temperature-dependent resistors. Limit-level measuring devices are, in particular, vibronic limit-level measuring devices, ultrasonic limit-level measuring devices, and/or capacitive limit-level measuring devices. Analytical measuring devices are, in particular, pH sensors, conductivity sensors, oxygen and active oxygen sensors, (spectro-) photometric sensors, and/or ion-selective electrodes.

In modern industrial plants, field devices are usually connected to higher-level units via communications networks such as fieldbuses (Profibus®, Foundation® Fieldbus, HART®, etc.) and industrial Ethernet (PROFINET®, EtherNetIP®). The higher-level units are control units, such as an SPS (storage programmable controller) or a PLC (programmable logic controller). The higher-level units are used, among other things, for process control, as well as for commissioning the field devices. The measured values captured by the field devices, in particular by sensors, are transmitted via the respective bus system to one (or possibly several) higher-level unit(s) that further process the measured values, as appropriate, and forward them to the control station of the plant. The control station serves for process visualization, process monitoring, and process control via the higher-level units. In addition, data transmission from the higher-level unit via the bus system to the field devices is also required, in particular for configuration and parameterization of field devices and for controlling actuators.

In addition to wired connections, field devices today usually have a communications unit that is configured to transfer data and commands wirelessly between the controller and a higher-level system, such as a cloud-based database, a production database, and/or an asset management system. Field devices of this type are increasingly being used in the field, where they send their measurement data wirelessly to a higher-level unit via a wireless communications interface. However, details on the quality of data transmission are often not available to the user of the field device, or only to a limited extent.

SUMMARY

The invention is based upon the object of providing a solution for determining a transmission quality.

The object is achieved by the method for determining a quality of a wireless transmission according to the present disclosure.

The method according to the invention for determining a quality or a grade of a wireless transmission of data packets of a field device via a wireless communications interface to a higher-level unit, comprising the following method steps:

- sending the data packets via the wireless communications interface to the higher-level unit,
  - wherein the data packets are sent intermittently;
- receiving the data packet through the higher-level unit;
- checking whether the time duration between two data packets received by means of the higher-level unit, a size of the respective data packets, and/or information stored in the respective data packets fulfills a criterion; and
- determining a communications status depending upon the check and optional output of the communications status.

A data package comprises measurement data, control data, history data, parameterization data, semantics for interpreting the data, diagnostic and/or status data.

The higher-level unit comprises a computer or a handheld device with a receiver unit or a cloud application.

The wireless communications interface supports a communications standard or wireless communications technologies such as WLAN and Bluetooth, WLAN and mobile radio, or the like.

It is not the field device or the wireless communications interface itself that determines the quality of the signal, but the higher-level unit, taking into account the points in time at which the data packets are received, and/or the received data packets and their content.

Advantageous embodiment of the invention are the subject matter of the dependent claims.

One embodiment provides that the data packets be checked for completeness of the information they contain.

One embodiment provides that the data packets be checked for interpretability, in particular complete interpretability.

To implement the two previous embodiments, for example, the size of the data packets can be checked and compared with previously received data packets. Alternatively, the bytes in the data packets can be checked to see whether there are zero rows or typical patterns for data that have not been filled in, which would indicate that information has been lost. An AI algorithm (artificial intelligence) could be trained to detect such patterns from zero rows.

One embodiment provides that a first check value stored in the data packet and determined by means of the field device using CRC be checked for consistency with a second check value determined by means of the higher-level unit using CRC.

The cyclic redundancy check (CRC) is a method for determining a single check value for a data packet, in order to recognize errors during transmission or storage. In order to determine the quality of the transmission or a communications status, a comparison of the check values can be taken into account.

In one embodiment, the data packets in each case contain measurement data,

- wherein the measurement data are in each case provided with a time stamp,
- wherein the check comprises the comparison of the time stamp with a point in time of receipt of the data packet in the higher-level unit.

One embodiment provides that the communications status be determined for a time-limited and recurring event.

One embodiment provides that the check be effected by a trained AI algorithm.

It is considered advantageous in connection with the method according to the invention if the trained AI algorithm works with the methods of machine learning. In particular, it is provided that the trained AI algorithm use at least one neural network. Alternative embodiments of the method according to the invention use the nearest neighbor method, decision trees, and/or a support vector machine. Further variants which can be used in conjunction with the solution according to the invention are the methods of linear or nonlinear regression, ensembles, naive Bayes, or logistic regression. These and other suitable methods from the field of artificial intelligence, which are used for the adaptive computation program, have become known, for example, from the textbook, "Grundkurs Künstliche Intelligenz," 4th edition, by Prof. Ertl.

The calculations are preferably carried out in a cloud application. Alternatively, the adaptive computing program can also be installed on an operating tool.

The central component of the system for carrying out the method according to the invention can be a self-learning expert system AIS. This expert system AIS uses methods of artificial intelligence to analyze the data and information available regarding the existing or installed field device base, carry out diagnostics based upon the collected data and information, and output a communications status to a user on the basis of the analysis and diagnosis.

One embodiment provides that the AI algorithm be trained to recognize a change in a transmission frequency set on the field device, taking into account the temporal behavior of the received data packets.

For example, the AI algorithm may have been trained to recognize patterns or changing patterns in the reception spectrum (temporal behavior of the received data packets) and adjust the criterion accordingly and/or output a status change to the operator.

One embodiment provides that the AI algorithm be trained to recognize an electrical loose contact and/or moisture in the field device, taking into account the temporal behavior of the received data packets, the size of the respective data packets, and/or the information stored in the respective data packets.

For this purpose, the AI algorithm can be trained on a large number of reception spectra, which show typical behavior for loose contacts and/or moisture in the field device.

One embodiment provides that the AI algorithm be trained to recognize environmental influences on the field device, taking into account the temporal behavior of the received data packets recorded over a specific period of time, the size of the respective data packets, and/or the information stored in the respective data packets, and in particular a geographical location of the field device.

There are influences on the transmission quality that occur for a limited time and then stop or pause. Such events can be identified by the temporal behavior of the received data packets and/or the temporal change in the size of the respective data packets and/or the information stored in the respective data packets. The AI algorithm is trained with these reception spectra. For a more precise identification of the environmental influences, a geographical location of the field device can be included in the check or determination.

One embodiment provides that the criterion comprise a variable size,

- wherein an adjustment of the criterion is effected by the trained AI algorithm.

BRIEF DESCRIPTION OF THE DRAWINGS

The present disclosure is explained in greater detail with reference to the following figures. Shown are.

DETAILED DESCRIPTION

Figure 1:
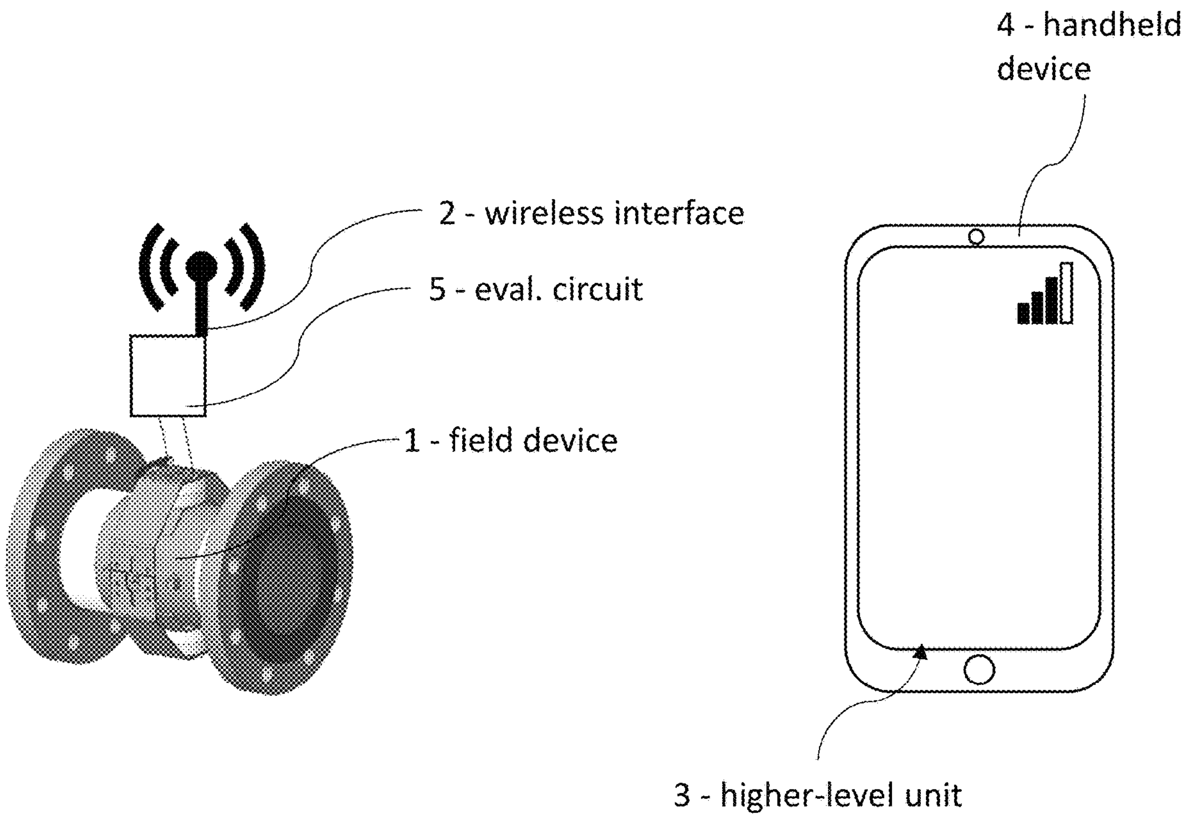
FIG. 1 shows a quality determination of the data transmission between a field device and a handheld device.

FIG. 1 shows a quality determination of the data transmission between a field device 1 and a handheld device 4. A field device 1 is configured to collect measurement data of a measuring point. An evaluation circuit 5 is configured to store the time-stamped measurement data in a memory and send it intermittently in a data packet with further diagnostic and status information via a wireless communications interface 2 to a higher-level unit 3. The higher-level unit 3 shown is a handheld device 4 with a display on which the measurement data, diagnostic and status information can be shown. A communications status, which provides information about the quality of the data packet transmission, can also be displayed. The handheld device has a computer program or a computer program product, which is configured to display the data of the data packet and the current transmission quality. The computer program has a trained AI algorithm that is configured to check the data packets and/or time durations. For example, the AI algorithm can be trained to recognize a change in a transmission frequency set on the field device, taking into account the temporal behavior of the received data packets. Alternatively, this can also be implemented using an alternative algorithm that is not based upon AI.

Furthermore, the AI algorithm can be trained to recognize an electrical loose contact and/or moisture in the field device, taking into account the temporal behavior of the received data packets, the size of the respective data packets, and/or the information stored in the respective data packets.

The computer program uses methods of artificial intelligence to classify and/or analyze the data, information, and additional information based upon the error codes provided by the field device, which indicate defined technical irregularities and/or malfunctions, for the quality of the transmission. By means of a multi-dimensional cluster method, the cause/causes for technical irregularities and/or malfunctions that have occurred on the field device are recognized via the higher-level unit. This recognized cause/these recognized causes is/are output to the operator on the higher-level unit. A warning message is generated if the technical irregularity and/or malfunction occurs on a plurality of field devices of the same field device type, and/or the field devices determine or monitor the same physical or chemical process variable in at least approximately the same applications and/or under the same process or environmental conditions.

Figure 2:
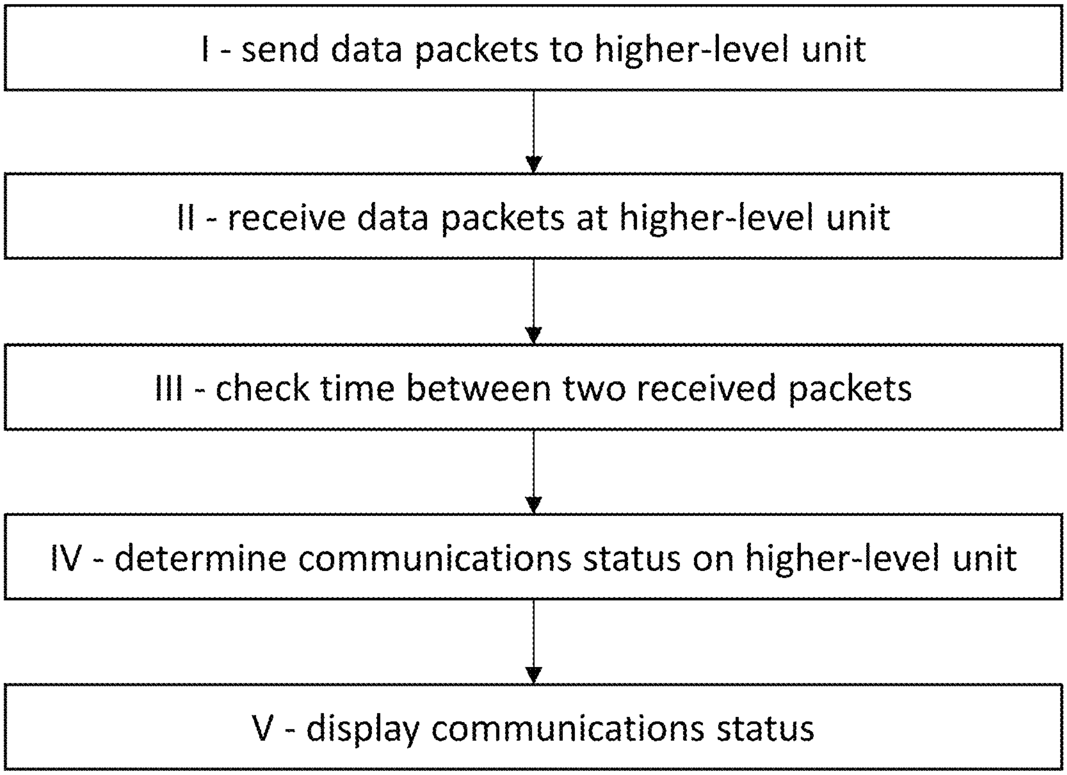
FIG. 2 shows an embodiment of the method according to the invention in the form of a flowchart.

FIG. 2 shows an embodiment of the method according to the invention in the form of a flowchart. In a first method step (I), data packets—which are received by a field device—are sent via a wireless communications interface to a higher-level unit. The wireless communications interface is configured to send the data packets intermittently. The data packets can be sent at fixed but variable time intervals.

In a second method step (II), the data packets are received by means of the higher-level unit.

To determine the quality of the wireless transmission of the data packets, it is then checked whether the time duration between two received data packets fulfills a stored criterion (III). This is effected in the higher-level unit. The stored criterion can comprise a target point in time—optionally, also with a fixed tolerance range—at which the data packet must be received. Alternatively, the stored criterion can directly comprise a target time range. It is particularly advantageous if the criterion is a variable size that adjusts to the temporal reception behavior. If the higher-level unit notices that the time duration between two received data packets has changed, and the new time duration is maintained for a sequence of a specified number of data packets, the deviation is assigned to a change in the transmission frequency, and the old criterion is replaced by the new, self-determined criterion. If the data packets are always sent when the measured data quantity assumes a set target value, an increased transmission frequency can be used to identify a loose contact in the field device or environmental influences (in the form of insects that have penetrated the inside of the housing).

Alternatively, the system checks whether the size of the respective data packages fulfills the stored criterion. If the data packets cannot be sent at all or only in part due to a disruption, the size of the subsequent data packets deviates from the usual size.

Alternatively, the system checks whether the information stored in the data packets fulfills the criterion. For this purpose, it can be checked whether the information stored in the data packet is complete, or whether some of the information was either not sent when the data packet was sent, or was lost en route or became uninterpretable due to errors. In this case, it is advantageous if the data packets are checked for interpretability, in particular complete interpretability. Furthermore, a frozen state of the field device can be recognized by checking the information in the data packets. The frozen state can refer to a specific value or a sequence of values within a data packet. The AI algorithm could, for example, be trained to recognize correlation breaks in a large amount of correlated measurement data. For example, a constant temperature measured inside the housing is a clear indication of a frozen state of the temperature sensor inside the housing, despite a sharp rise in the temperature of the medium in contact.

Alternatively, the check comprises several of the aforementioned comparisons with corresponding criteria.

Depending upon the result of the check, a communications status is determined on the higher-level unit (IV). If the transmission frequency or the time duration between the data packets is adhered to and/or the data packets are sent in full.

Alternatively, a plurality of checks—which can also be evaluated differently if necessary—can be included in the determination of the communications status.

It can also be advantageous if the communications status is determined for a time-limited and recurring event. Particularly in the case of events that occur only seasonally—such as sandstorms, vegetation, or snowfall—but which have a negative impact upon transmission quality, the output of the communications status, which not only refers to the current transmission quality, but also takes into account a broad transmission period, can help the operator to take the necessary precautions. According to a further embodiment, the geographical location and/or weather information allocated to the measuring point is also taken into account for the creation of the communications status.

In a final method step (V), the communications status is shown, for example, on a display of the higher-level unit.

The invention claimed is:

1. A method for determining a quality of a wireless transmission of data packets of a field device via a wireless communications interface to a higher-level unit, wherein the data packets in each case contain measurement data that are in each case provided with a time stamp, the method comprising:

sending intermittently the data packets via the wireless communications interface to the higher-level unit;

receiving the data packets through the higher-level unit;

comparing the time stamp with a point in time of receipt of the data packet in the higher-level unit;

checking whether a time duration between two data packets received by the higher-level unit, a size of the respective data packets, and/or information stored in the respective data packets fulfills a criterion, wherein the check is effected by a trained AI algorithm;

training the AI algorithm to recognize a change in a transmission frequency set on the field device, taking into account the temporal behavior of the received data packets; and determining a communications status depending upon the check and outputting the communications status.

2. The method according to claim 1, further comprising: checking the data packets for completeness of the information they contain.

3. The method according to claim 2, further comprising: checking the data packets for interpretability.

4. The method according to claim 1, further comprising: checking for consistency a first check value stored in the data packets and determined by the field device using a cyclic redundancy check (CRC) with a second check value determined by the higher-level unit using the CRC.

5. The method according to claim 1, further comprising: determining the communications status for a time-limited and recurring event.

6. The method according to claim 1, further comprising: training the AI algorithm to recognize an electrical loose contact and/or moisture in the field device, taking into account the temporal behavior of the received data packets, the size of the respective data packets, and/or the information stored in the respective data packets.

7. The method according to claim 6, further comprising: training the AI algorithm to recognize environmental influences on the field device, taking into account the temporal behavior of the received data packets recorded over a specific period of time, the size of the respective data packets, and/or the information stored in the respective data packets, and a geographical location of the field device.

8. The method according to claim 7, wherein the criterion comprises a variable size, wherein an adjustment of the criterion is effected by the trained AI algorithm.

* * * * *